United States Patent [19]

Hesky et al.

[11] 4,190,507
[45] Feb. 26, 1980

[54] PROCESS FOR CONCENTRATING TRITIUM AND/OR TRITIUM HYDRIDE AND SEPARATING IT FROM TRITIUM WATER

[75] Inventors: Hans Hesky, Runkel; Armin Wunderer, Hofheim am Taunus, both of Fed. Rep. of Germany

[73] Assignee: Hoechst Aktiengesellschaft, Frankfurt am Main, Fed. Rep. of Germany

[21] Appl. No.: 886,518

[22] Filed: Mar. 14, 1978

[30] Foreign Application Priority Data

Mar. 16, 1977 [DE] Fed. Rep. of Germany ....... 2711366

[51] Int. Cl.² .............................................. C25B 1/04
[52] U.S. Cl. .................................................. 204/129
[58] Field of Search ................... 204/129; 423/648 A

[56] References Cited

U.S. PATENT DOCUMENTS

| | | | |
|---|---|---|---|
| 2,137,430 | 11/1938 | Webb | 204/129 |
| 3,306,832 | 2/1967 | Lewis et al. | 204/129 |
| 3,505,017 | 4/1970 | Roth | 423/648 A |

FOREIGN PATENT DOCUMENTS

| | | | |
|---|---|---|---|
| 1058479 | 6/1959 | Fed. Rep. of Germany | 204/129 |
| 39-17654 | 8/1964 | Japan | 423/648 A |

OTHER PUBLICATIONS

"Encyclopedia of Chem. Technology" by Kirk-Othmer, 2nd Ed., vol. 6, 1965, pp. 903-905.

Primary Examiner—R. L. Andrews
Attorney, Agent, or Firm—Curtis, Morris & Safford

[57] ABSTRACT

In the reprocessing of spent nuclear fuel radioactive tritium is formed among others. Elemental tritium and/or tritium hydride can be stored without control provided that the generated heat is dissipated. To concentrate and separate tritium and/or tritium hydride, the tritium water obtained in the reprocessing of spent nuclear fuel is enriched with tritium hydroxide and ditritium oxide by distillation and the mixture obtained is subjected to electrolysis.

3 Claims, 1 Drawing Figure

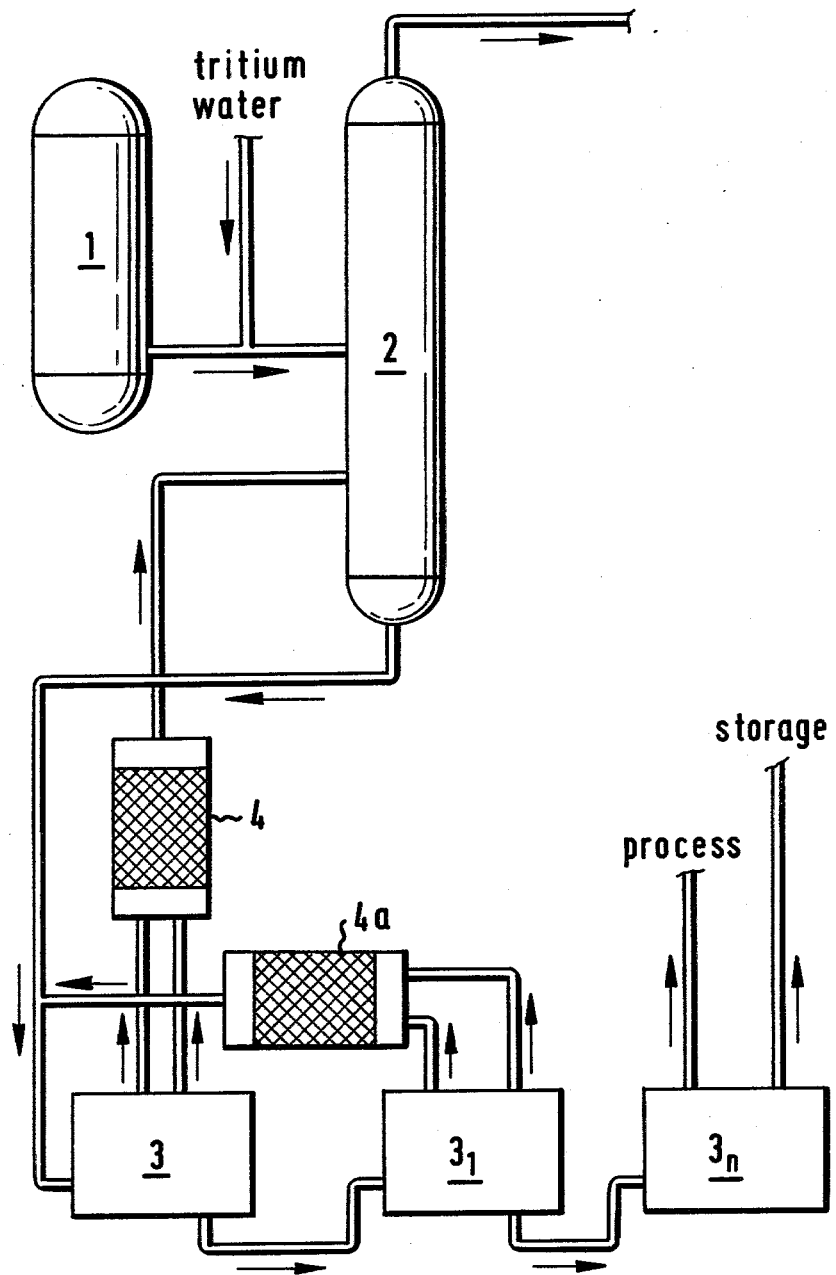

PROCESS FOR CONCENTRATING TRITIUM AND/OR TRITIUM HYDRIDE AND SEPARATING IT FROM TRITIUM WATER

This invention relates to a process for obtaining concentrated tritium and/or tritium hydride and separating it from tritium water.

In the reprocessing of spent nuclear fuel, the radioactive substance, tritium, in addition to other substances, is released. The tritium so obtained is in the form of tritium water which cannot be recycled and must be stored. Tritium water is intended to include a mixture of water ($H_2O$), tritium hydroxide (TOH) and di-tritium oxide ($T_2O$). Due to the radioactivity of tritium, the tritium water is decomposed into oxyhydrogen gas and tritium steam which must be stored under controlled conditions. By contrast, elemental tritium and/or tritium hydride can be stored without any need for controlled conditions provided that the generated heat is dissipated in a suitable manner.

It is therefore, the object of the present invention to obtain tritium and tritium hydride in a high concentration.

This problem is solved by increasing the concentration of tritium hydroxide and di-tritium oxide in the tritium water through distillation and then electrolyzing the enriched mixture.

The mixture can preferably be charged to an electrolytic enrichment cascade. The product of electrolysis, i.e., concentrated tritium, is stored and the oxygen is reduced by NO and worked-up to yield nitric acid, which is then used as a solvent in the reprocessing of spent nuclear fuel.

The invention will now be described by way of reference to the accompanying drawing.

Referring to the drawing, tritium water is stored in container (1) and is then introduced into distillation column (2). The overhead from the distillation column (2) consists of tritiumfree water and can be recycled to the reprocessing cycle while the distillation column bottoms consists of water enriched with tritium. The water enriched with tritium is passed into and through an electrolytic cascade consisting of electrolysis cells (3), ($3_1$) to ($3_n$). Through electrolysis, about three times more hydrogen is formed than tritium, thereby increasing the concentration of tritium in the electrolyte from one electrolytic cell to the next. In reactors (4) and (4a) the hydrogen and oxygen formed as electrolysis products in cells (3) and ($3_1$), respectively, is burned catalytically, thereby yielding water which is recycled into the preceding cell. In the last cell of the cascade, a high concentration of tritium and oxygen is obtained. The tritium is transferred to a storage site while the oxygen is recycled into the reprocessing cycle.

We claim:

1. Process for recovering tritium and/or tritium hydride from tritium-containing water comprising the steps of vaporizing and removing tritium-free water, thereby leaving a stream consisting essentially of tritium hydroxide and di-tritium oxide and then electrolyzing the enriched mixture to obtain a high concentration of tritium and/or tritium hydride.

2. A process according to claim 1, wherein the removal of substantially tritium-free water is effectuated by distillation wherein the overhead consists essentially of tritium-free water and the bottoms substantially consists of tritium hydroxide and di-tritium oxide.

3. A process according to claim 1, wherein the enriched mixture is electrolyzed in an electrolytic enrichment cascade consisting of a series of electrolytic cells.

* * * * *